United States Patent Office 2,728,936
Patented Jan. 3, 1956

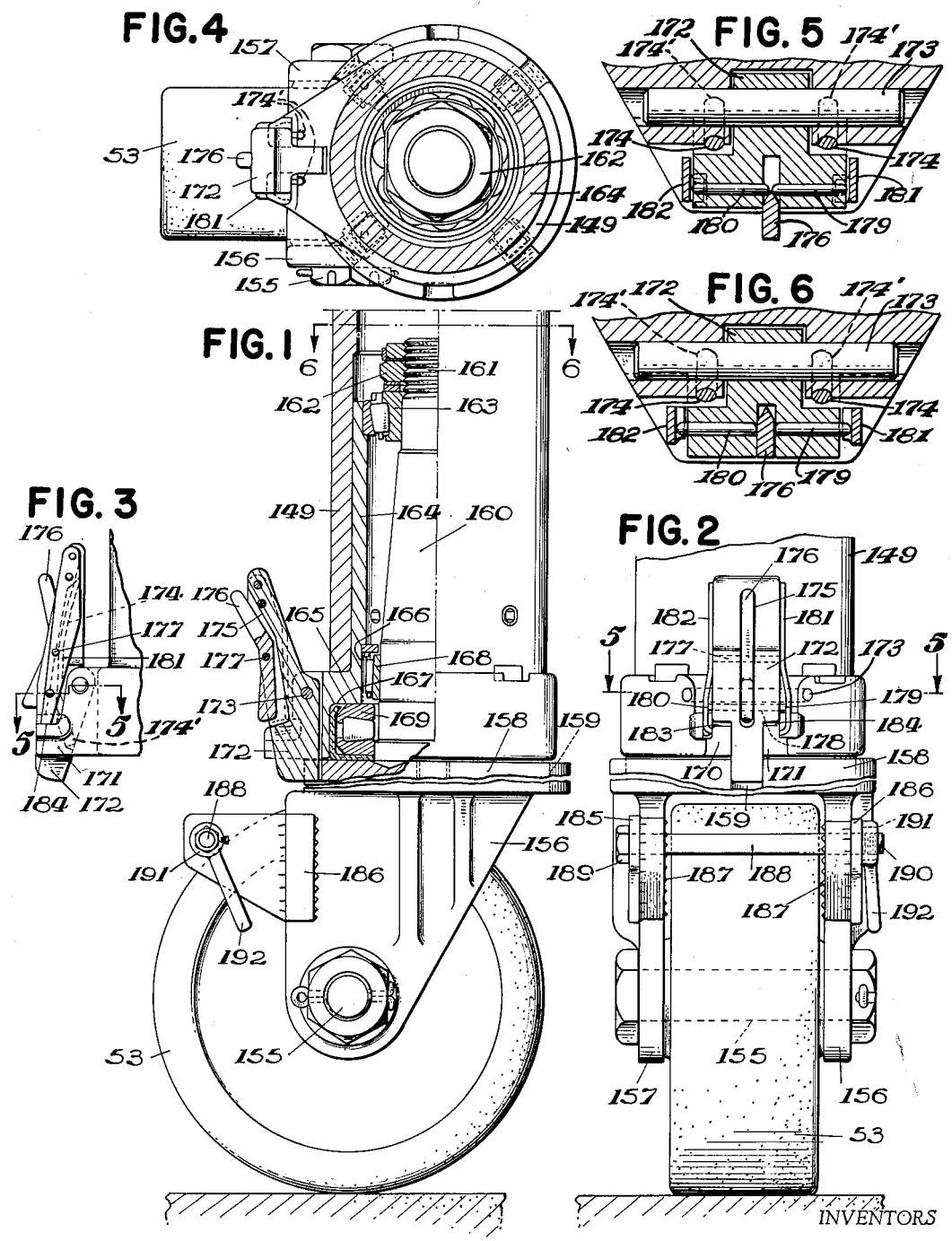

2,728,936

CASTER WITH SWIVEL LOCK

William C. Hodges and Alexander L. Robb, Redwood City, Calif., assignors to Hodges Research and Development Company, Redwood City, Calif., a corporation of California Original application October 31, 1949, Serial No. 124,592. Divided and this application August 29, 1951, Serial No. 244,189

2 Claims. (Cl. 16—35)

This invention relates to casters for handling transportable containers and more particularly to such casters for less than carload lot sized containers which are transferred thereon from and to various types of transporting means or transferred from or to loading docks and the like from or to various types of transporting means.

Heretofore many caster structures have been proposed but none which are satisfactory for shifting less than carload lot sized containers between various means of transportation or to or from loading docks and the like from or to various transporting means. These known casters are subject to various objections, including unnecessarily complicated and expensive structure.

By the present invention we have overcome all of the inherent difficulties in these known caster structures and have provided a novel caster for the transfer of less than carload lot containers which is of such a simple yet powerful construction that less than carload lot sized containers may be readily transferred thereon.

We have overcome the difficulties inherent in transferring less than carload lot containers by providing the container with castering support at each corner so that it is possible to readily move the container from one position to another and we provide means for controlling the position of the casters so that the container may be readily towed or pushed into any desired position thus making it possible to effect load transportation from point of origin to point of ultimate disposition without shifting of the load from the container.

It is accordingly an object of the present invention to provide novel casters for less than carload lot containers.

Another object is to provide a novel construction for locking the casters in any desired castered position to facilitate transportation of our containers on their casters in any desired direction.

Another object is to provide novel braking mechanisms for our casters.

Other and further objects of the present invention will appear from the following description.

Our invention is capable of various mechanical embodiments, one of which is shown in the accompanying drawings and is described hereinafter for purposes of illustration. It should be understood therefore that this illustrative embodiment of our invention in no way defines or limits the same and reference should be had to the appended claims for this purpose.

This application is a division of our copending application Serial No. 124,592, filed October 31, 1949.

Referring now to the several drawings, in which like reference characters indicate like parts, Fig. 1 is an elevation partly in section of the novel mechanism for providing castering action for the casters which are employed at each corner of the container and shows the novel locking mechanism for locking the casters in various positions as well as the novel mechanism for braking the casters;

Fig. 2 is a view of the mechanism of Fig. 3 as seen from the left therein;

Fig. 3 is an enlarged detail of the latching mechanism of Figs. 1 and 2;

Fig. 4 is a cross-sectional view of the mechanism of Fig. 1 on line 21—21 thereof.

Fig. 5 is a sectional view on the line 5—5 of Fig. 3 of a portion of the latch and trigger mechanism showing the operation of the spring operating pins showing the pins in disengaged position; and Fig. 6 is a view similar to that of Fig. 5 showing the pins and springs in engaged position.

Referring now to the several figures, a suitable structure for the caster mounting in the lower end of leg 149 which may be suitably secured to a corner of the container and for locking the same in any desired position as well as for braking the caster is shown in Figs. 1–5. As there shown, caster 53 is mounted upon a suitable axle 155 which is carried in forks 156 and 157. Forks 156 and 157 are secured to a circular base 158 which is provided with a plurality of radially recessed apertures 159 for reasons that will appear more fully hereinafter. A central conical shaft 160 is carried by base 158 and terminates in threaded portion 161 upon which are mounted locking nuts 162 to secure bearing 163 thereto. A cylindrical bearing member 164 is mounted within caster leg 149 and terminates in a circular radially extending shoulder 165 which abuts the bottom of leg 149. Member 164 is cut away at 166 and 167 to receive bearings 168 and 169 respectively, which cooperate with shaft 160. A pair of outwardly extending ears 170 and 171 are provided on member 164 and latch 172 is mounted therein on pivot 173. Latch 172 is designed to cooperate with apertures 159 and when engaged in apertures 159 locks caster 53 in position. Leaf springs 174 are positioned behind latch 172 to urge the same into engagement with apertures 159 and are mounted in sockets 174' formed in ears 170 and 171 (Figs. 3, 5 and 6). Latch 171 is slotted at 175 and a trigger 176, which is wedge-shaped in cross section (Figs. 5 and 6), is pivoted in slot 175 at 177. Latch 172 is cross-bored at 178 and a pair of pins 179 and 180 are mounted in bore 178. Flat springs 181 and 182 are secured to the outer edges of latch 172 and are of such a length that when latch 172 is in disengaged position, these leaf springs will snap onto the shoulders 183 and 184, formed on ears 170 and 171, respectively. Thus, when latch member 172 is rotated in a clockwise direction as seen in Fig. 1, out of engagement with apertures 159, springs 181 and 182 will retain the same out of engagement with apertures 159 so that casters 53 can rotate freely. When it is desired to lock casters 53 in any given position, trigger 176 is rotated in a counterclockwise direction as seen in Fig. 1, and this by reason of its wedge-shape forces pins 179 and 180 outwardly and pushes springs 181 and 182 off of shoulders 183 and 184, thus releasing latch 172 and spring 174 rotates the same into engagement with the proximate aperture 159.

Because of the weight of the container, particularly when loaded, it may be desirable in many instances, to provide brakes for the casters 53 either to lock them against rotation or to brake their rotation. For this purpose, we secure outwardly extending resilient braking elements 185 and 186 to forks 157 and 156, respectively, and these elements are provided with serrated inner surfaces, as at 187, for engagement with the sides of casters 53. A bolt 188 passes through elements 185 and 186, clear of the caster wheel, and is secured to element 185 at 189. Bolt 188 is provided at its other end with threads 190 upon which a nut 191 is mounted. A suitable wrench 192 or lever is provided for rotating nut 191 upon said threads 190 to bring serrated surfaces 187 into engagement with caster wheels, thus providing a braking or locking action for the same.

Lever 176, latch 172 and brake lever 192 may be operated either manually or by foot. This increases the ease of operation because of the relatively low position of these members when the container is supported on the casters as when moved on platforms or plant floors, and the relatively high position of these elements when the container is being transferred between or resting upon transportation devices or platforms or the like.

It is now apparent that by the present invention we have provided a novel caster apparatus which apparatus efficiently accomplishes all of the objectives described above.

It will now be apparent to those skilled in the art that changes in or modifications to the above described illustrative embodiment of our invention may now be made without departing from our inventive concept. The structure of the casters, and their swiveling mechanisms, may be modified within the scope of our invention. Reference should therefore be had to the appended claims to determine the scope of this invention.

What is claimed is:

1. In a caster mechanism a bearing member, a base rotatable on said bearing member, a caster wheel mounted on said base, spaced ears carried by the bearing member, a latch pivotally mounted between said ears, latch engaging means in said base, resilient means urging said latch into engagement with said latch engaging means, resilient means carried by said latch and engaging said ears when said latch is in disengaged position and manually operable means pivoted in said latch for disengaging said second named resilient means from said ears.

2. A mechanism as described in claim 1 in which said manually operable means include a trigger pivoted in said latch and means slidably mounted in said latch and connecting said trigger and said second named resilient means.

References Cited in the file of this patent

UNITED STATES PATENTS

| | | |
|---|---|---|
| 918,636 | Young | Apr. 20, 1909 |
| 1,137,329 | Johnson | Apr. 27, 1915 |
| 1,804,541 | Perin | May 12, 1931 |
| 1,922,098 | Kilian | Aug. 15, 1933 |
| 2,068,160 | Zeindler | Jan. 19, 1937 |
| 2,422,892 | Forbes et al. | June 24, 1947 |
| 2,478,563 | Book | Aug. 9, 1949 |